(12) United States Patent
Miyamoto et al.

(10) Patent No.: US 11,128,243 B2
(45) Date of Patent: Sep. 21, 2021

(54) DRIVE APPARATUS OF ELECTRIC MOTOR AND ELECTRIC PUMP APPARATUS

(71) Applicant: AISIN SEIKI KABUSHIKI KAISHA, Kariya (JP)

(72) Inventors: Hiroyuki Miyamoto, Chita-gun (JP); Koichi Aizawa, Chiryu (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 44 days.

(21) Appl. No.: 16/525,814

(22) Filed: Jul. 30, 2019

(65) Prior Publication Data
US 2020/0044586 A1 Feb. 6, 2020

(30) Foreign Application Priority Data

Jul. 31, 2018 (JP) .............................. JP2018-143183

(51) Int. Cl.
 *H02P 21/18* (2016.01)
 *H02P 21/22* (2016.01)
 *H02P 6/18* (2016.01)
 *H02P 6/30* (2016.01)
 *F04B 9/00* (2006.01)
 *H02P 6/15* (2016.01)

(52) U.S. Cl.
 CPC ................. *H02P 6/18* (2013.01); *F04B 9/00* (2013.01); *H02P 6/153* (2016.02); *H02P 6/30* (2016.02); *H02P 21/18* (2016.02)

(58) Field of Classification Search
 CPC ............... H02P 6/182; H02P 6/17; H02P 8/14
 See application file for complete search history.

(56) References Cited

U.S. PATENT DOCUMENTS

| 7,893,638 | B2 | 2/2011 | Akama et al. | |
| 8,217,603 | B2 | 7/2012 | Akama et al. | |
| 2008/0252242 | A1* | 10/2008 | Akama | ...................... H02P 6/06 318/400.14 |
| 2012/0062157 | A1 | 3/2012 | Ota et al. | |
| 2015/0236626 | A1 | 8/2015 | Ota et al. | |
| 2016/0233803 | A1* | 8/2016 | Hano | ...................... H02P 6/188 |

FOREIGN PATENT DOCUMENTS

| JP | 2008-141828 A | 6/2008 |
| JP | 2012-60781 A | 3/2012 |
| JP | 2012-60782 A | 3/2012 |
| JP | 2013-59194 A | 3/2013 |
| JP | 2018-121501 A | 8/2018 |

* cited by examiner

*Primary Examiner* — Kawing Chan
*Assistant Examiner* — Charles S Laughlin
(74) *Attorney, Agent, or Firm* — Sughrue Mion, PLLC

(57) ABSTRACT

A drive apparatus of an electric motor which does not include a position detection sensor, the drive apparatus includes drive portion configured to drive the electric motor on the basis of a command value inputted from outside, a number-of-rotations detection portion configured to detect a number of rotations of the electric motor driven by the drive portion, an out-of-phase judgement portion judging that the electric motor is out of phase in a case where the number of rotations detected by the number-of-rotations detection portion is less than a predetermined threshold value, and the predetermined threshold value being configured to be changed on the basis of the command value inputted from outside.

5 Claims, 3 Drawing Sheets

DRIVE APPARATUS OF ELECTRIC MOTOR AND ELECTRIC PUMP APPARATUS

CROSS REFERENCE TO RELATED APPLICATIONS

This application is based on and claims priority under 35 U.S.C. § 119 to Japanese Patent Application 2018-143183, filed on Jul. 31, 2018, the entire content of which is incorporated herein by reference.

TECHNICAL FIELD

This disclosure generally relates to a drive apparatus of an electric motor which does not include a position detection sensor, and an electric pump apparatus.

BACKGROUND DISCUSSION

A control apparatus of a brushless motor is conventionally known, which does not include a position detection sensor provided with an out-of-phase judgement portion judging that the electric motor is out of phase (for example, refer to JP2012-60781A which will be referred to also as Patent document 1).

A control apparatus of a brushless motor described in Patent document 1 includes an abnormality detection means (out-of-phase judgement portion) which judges that the brushless motor includes abnormality on the basis that an axis error exceeds a predetermined reference value. Here, when a magnetic flux axis of the brushless motor is a d axis, an axis which is orthogonal to the d axis is a q axis, "axis error" corresponds to an axis deviation angle of a d-q axis which is a rotational coordinate axis and a d-q axis which is an imaginary axis in the control, relative to each other. Specifically, in Patent document 1, the axis error is calculated on the basis of a voltage command value, an electric current value, a rotational speed, and a brushless motor constant, with the use of a predetermined calculation formula. It is judged that the brushless motor includes abnormality on the basis that the axis error has exceeded a predetermined reference value.

In a case of a brushless motor, if the axis error is in a range of ±90 degrees, the brushless motor is stabled. In a caser where field-weakening control is conducted, the axis error is controlled to be in a range of ±60 degrees. Therefore, in Patent document 1, it is configured such that judgement of abnormality is made when the axis error exceeds ±60 degrees.

In a blushless motor which does not include the position detection sensor, a position of a rotor is detected on the basis of an induced voltage generated at the brushless motor. In a region in which the number of rotations of the brushless motor is relatively low, however, the position of the brushless motor (the rotor) cannot be detected because the induced voltage of the brushless motor is not generated (or the induced voltage is weak). Thus, out-of-phase (that is, the rotor rotates in a state of not being synchronized with a command value of input) may occur in the region in which the number of rotations of the brushless motor is relatively low. Even in a region in which the number of rotations of the brushless motor is relatively high, the out-of-pulse may occur due to a sudden change of the number of rotations of the rotor. In the Patent document 1, the axis error is calculated on the basis of the voltage command value. Accordingly, it is considered that not only the out-of-phase in the region in which the number of rotations of the brushless motor is relatively low (a region in which a duty ratio of the voltage command value is small), but also the out-of-phase in the region in which the number of rotations of the brushless motor is relatively high (a region in which the duty ratio of the voltage command value is large) is detected. That is, it is considered that Patent document 1 is configured such that the out-of-phase is detectable in the plural regions of the number of rotations of the brushless motor.

According to the control apparatus of the blushless motor described in Patent document 1, however, the axis error needs to be calculated on the basis of the voltage command value, the electric current value, the speed of rotations, and the brushless motor constant with the use of the predetermined calculation formula, for judging abnormality (including, out-of-phase) of the brushless motor in plural regions of the numbers of rotations. Generally, for detecting an electric current value, an amplifier is needed to amplify signal of the detected electric current. Accordingly, the configuration described in Patent document 1 includes a problem that a configuration for detecting the abnormality of the brushless motor is relatively complicated.

A need thus exists for a drive apparatus of an electric motor and an electric pump apparatus which are not susceptible to the drawback mentioned above.

SUMMARY

According to an aspect of this disclosure, a drive apparatus of an electric motor which does not include a position detection sensor includes a drive portion configured to drive the electric motor on the basis of a command value inputted from outside, a number-of-rotations detection portion configured to detect a number of rotations of the electric motor driven by the drive portion, an out-of-phase judgement portion judging that the electric motor is out of phase in a case where the number of rotations detected by the number-of-rotations detection portion is less than a predetermined threshold value, and the predetermined threshold value being configured to be changed on the basis of the command value inputted from outside.

According to another aspect of this disclosure, an electric pump apparatus includes an electric pump configured to be driven by an electric motor which does not include a position detection sensor, and a drive apparatus of the electric motor. The drive apparatus of the electric motor includes a drive portion configured to drive the electric motor on the basis of a command value inputted from outside, a number-of-rotations detection portion configured to detect a number of rotations of the electric motor driven by the drive portion, an out-of-phase judgement portion judging that the electric motor is out of phase in a case where the number of rotations detected by the number-of-rotations detection portion is less than a predetermined threshold value, and the predetermined threshold value being configured to be changed on the basis of the command value inputted from outside.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment disclosed here will be described on the basis of the drawings.

A configuration of a drive apparatus 100 of an electric motor 110 (an electric pump apparatus 200) according to the embodiment will be described with reference to FIGS. 1 and 2. The electric motor 110 corresponds to a direct current brushless motor which is not provided with a position detection sensor.

Figure 1:
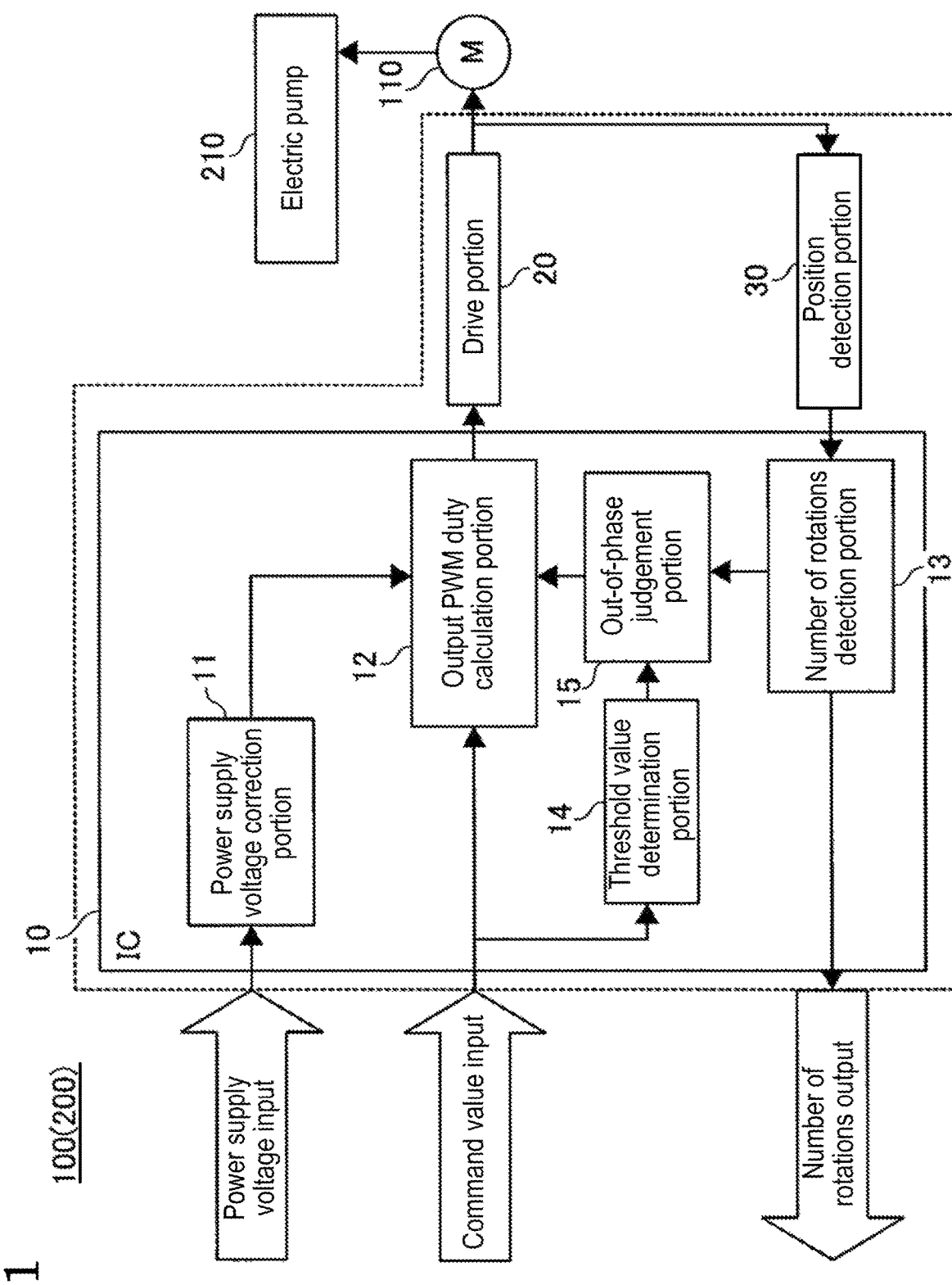
FIG. 1 is a block diagram of a drive apparatus of an electric motor (an electric pump apparatus) according to an embodiment disclosed here.
Figure 2:
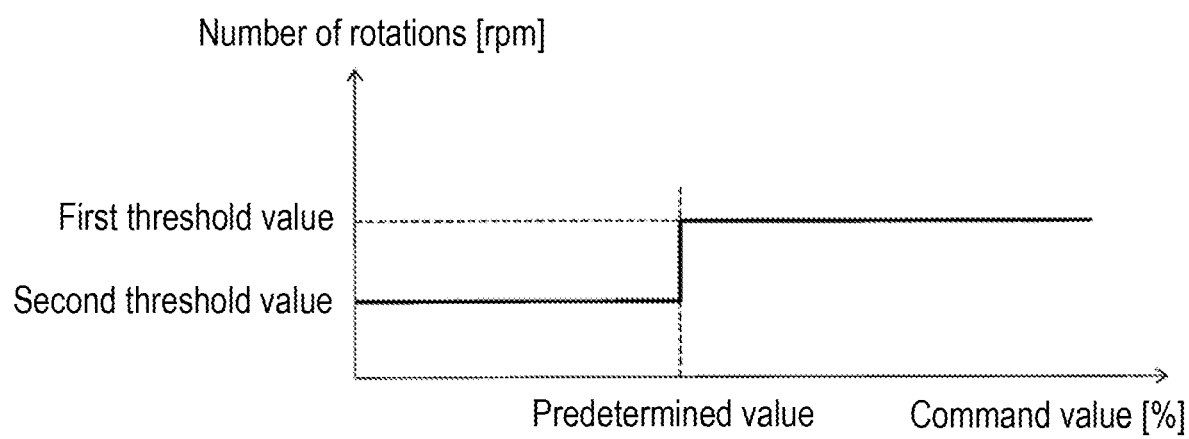
FIG. 2 is a view illustrating relation between an input instruction and a predetermined threshold value on which whether out-of-phase exists or not is judged, according to the embodiment.

As illustrated in FIG. 1, the electric pump apparatus 200 is configured to be driven or actuated by the electric motor 110. For example, the electric pump apparatus 200 corresponds to an electric water pump apparatus for cooling an inverter. The electric pump apparatus 200 includes an electric pump 210.

The drive apparatus 100 includes an IC (integrated circuit) 10. It is configured such that a command value is inputted to the IC 10. Specifically, the command value corresponds to a duty ratio (%) corresponding to a target number of rotations of the electric motor 110.

The IC 10 includes a power supply voltage correction portion 11. Electric voltage of power supply which is supplied to the IC 10 is inputted to the power supply voltage correction portion 11. The electric voltage of power supply which is supplied to the IC 10 may change or fluctuate. Thus, the power supply voltage correction portion 11 is configured to output, to an output PWM duty calculation portion 12, a signal which is related to a correction such that the fluctuation of the electric voltage of power supply supplied to the IC 10 does not influence the number of rotations of the electric motor 110.

The IC 10 includes the output PWM duty calculation portion 12. The output PWM duty calculation portion 12 is configured to generate a PWM signal on the basis of the inputted command value and the signal related to the correction which is outputted from the power supply voltage correction portion 11.

The drive apparatus 100 includes a drive portion 20. The drive portion 20 is configured to drive the electric motor 110 on the basis of a command value inputted from outside. Specifically, the drive portion 20 drives a switching element provided inside the drive portion 20 on the basis of the PWM signal outputted from the output PWM duty calculation portion 12. Thus, the electric motor 110 is driven at a desired number of rotations.

The drive apparatus 100 includes a position detection portion 30. The position detection portion 30 is configured to detect (estimate), on the basis of an induced voltage generated at the electric motor 110, a position of a rotor.

The IC 10 includes a number-of-rotations detection portion 13. The number-of-rotations detection portion 13 is configured to detect (estimate) the number of rotations of the rotor on the basis of the position of the rotor which is detected (estimated) by the position detection portion 30. The number of rotations of the rotor which is detected by the number-of-rotations detection portion 13 is configured to be outputted outside the IC 10.

The IC 10 includes a threshold value determination portion 14. The threshold value determination portion 14 is configured to determine a threshold value (number of rotations, that is, rpm) on which whether or not the electric motor 110 is out of phase, that is, whether or not the electric motor 110 is in a state of loss of synchronization, is judged. In the embodiment, a predetermined threshold value is configured to be changed on the basis of the command value (duty ratio (%)) inputted from outside. Specifically, as illustrated in FIG. 2, the predetermined threshold value includes a first threshold value for a case in which the command value inputted from outside is equal to or greater than a predetermined value and a second threshold value for a case in which the command value inputted from outside is less than the predetermined value. The second threshold value is smaller than the first threshold value. For example, the predetermined value of the command value (duty ratio) is 30%. For example, the first threshold value is 800 rpm. For example, the second threshold value is 160 rpm. The predetermined threshold value is configured such that either of the first threshold value and the second threshold value is chosen on the basis of the command value inputted from outside. For example, the first threshold value and the second threshold value are stored in advance at a storage portion, and either of the first threshold value and the second threshold value is chosen on the basis of the command value. Because the occurrence of the out-of-phase is attributed to the number of rotations of the electric motor, the predetermined threshold value for judging the out-of-phase (loss of synchronization) can be chosen appropriately in accordance with the command value (duty ratio) inputted from outside.

In the embodiment, as illustrated in FIG. 1, the IC 10 includes an out-of-phase judgement portion 15. The out-of-phase judgement portion 15 judges that the electric motor 110 is out of phase in a case where the number of rotations which is detected by the number-of-rotations detection portion 13 is less than the predetermined threshold value. The out-of-phase judgement portion 15 chooses the first threshold value (for example, 800 rpm) in a case where, for example, the command value (duty ratio) is equal to or greater than 30%. The out-of-phase judgement portion 15 judges that the electric motor 110 is out of phase in a case where the number of rotations detected by the number-of-rotations detection portion 13 is less than the first threshold value. Specifically, the out-of-phase judgement portion 15 judges that the electric motor 110 is out of phase in a case where the number of rotations detected by the number-of-rotations detection portion 13 is less than the first threshold value for a predetermined time period (for example, for three seconds). Thus, the out-of-phase can be detected in a region in which the number of rotations of the electric motor 110 is relatively high. The out-of-phase judgement portion 15 chooses the second threshold value (for example, 160 rpm) in a case where, for example, the command value (duty ratio) is less than 30%. The out-of-phase judgement portion 15 judges that the electric motor 110 is out of phase in a case where the number of rotations detected by the number-of-rotations detection portion 13 is less than the second threshold value. Specifically, the out-of-phase judgement portion 15 judges that the electric motor 110 is out of phase in a case where the number of rotations detected by the number-of-rotations detection portion 13 is less than the second threshold value for a predetermined time period (for example, for three seconds). Thus, the out-of-phase can be detected in a region in which the number of rotations of the electric motor 110 is relatively low.

In the embodiment, a voltage command to the electric motor 110 is stopped and thus the electric motor 110 is stopped, in a case where it is judged by the out-of-phase judgement portion 15 that the electric motor 110 is out of phase. Specifically, the output of the PWM signal from the output PWM duty calculation portion 12 to the drive portion 20 is stopped in a case where the out-of-phase judgement portion 15 judges that the electric motor 110 is out of phase. Accordingly, the electric motor 110 is made to stop. The electric motor 110 is stopped for one second, for example. At this time, the rotor of the electric motor 110 is stopped at a predetermined position which is determined in advance.

In a case where it is judged by the out-of-phase judgement portion 15 that the electric motor 110 is out of phase, the electric motor 110 which is in the stopped state is configured to be re-started. That is, the electric motor 110 is re-started in a state where the rotor of the electric motor 110 is stopped at the predetermined position which is determined in advance. That is, the output of the PWM signal from the output PWM duty calculation portion 12 to the drive portion 20 is started again. Thus, the electric motor 110 is started while the out-of-phase or loss of synchronization is being restricted from occurring.

Figure 3:
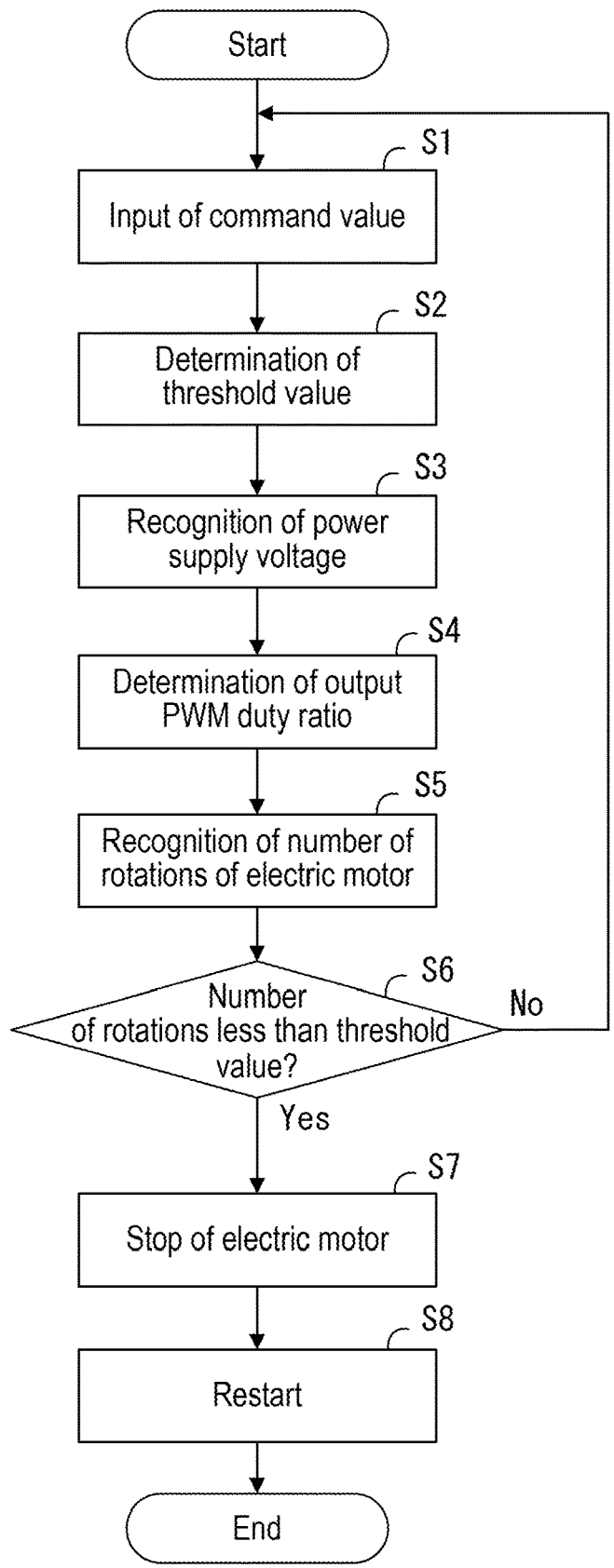
FIG. 3 is flow chart for explaining operation of the drive apparatus of the electric motor according to the embodiment.

Next, operations of the drive apparatus 100 of the electric motor 110 will be described with reference to FIG. 3.

First, at Step S1, the command value is inputted to the IC 10.

Next, at Step S2, the predetermined threshold value is determined by the threshold value determination portion 14. Specifically, the first threshold value is selected in a case where the command value is equal to or greater than the predetermined value. The second threshold value is selected in a case where the command value is less than the predetermined value.

Next, at Step S3, the electric voltage of power supply which is supplied to the IC 10 is inputted to the power supply voltage correction portion 11, and thus the power supply voltage correction portion 11 recognizes the electric voltage of power supply supplied to the IC 10. Then, the power supply voltage correction portion 11 outputs, to the output PWM duty calculation portion 12, the signal that is related to the correction.

Next, at Step S4, the output PWM duty calculation portion 12 generates the PWM signal on the basis of the inputted command value and the signal related to correction which is outputted from the power supply voltage correction portion 11. Then, the electric motor 110 is driven by the drive portion 20 in accordance with the generated PWM signal.

Next, at Step S5, the number-of-rotations detection portion 13 detects (estimates) the number of rotations of the rotor on the basis of the position of the rotor which is detected (estimated) by the position detection portion 30. Then, the detected number of rotations of the rotor is inputted to the out-of-phase judgement portion 15, and thus the out-of-phase judgement portion 15 recognizes the number of rotations of the rotor.

Next, at Step S6, the out-of-phase judgement portion 15 judges whether or not the number of rotations detected by the number-of-rotations detection portion 13 is less than the predetermined threshold value for three seconds, for example. In a case where the out-of-phase judgement portion 15 judges that the number of rotations is not less than the predetermined threshold value (No at Step S6), the flow returns to Step S1. In a case where the out-of-phase judgement portion 15 judges that the number of rotations is less than the predetermined threshold value (Yes at Step S6), the out-of-phase judgement portion 15 judges that the electric motor 110 is out of phase. Then, the flow moves to Step S7.

Next, at Step S7, the voltage command to the electric motor 110 is stopped and the electric motor 110 is stopped for, for example, one second.

Next, at Step S8, the electric motor 110 is re-started.

According to the embodiment, the following effects can be obtained.

In the embodiment, the threshold value, with which the out-of-phase judgement portion 15 judges the out-of-phase, is changed on the basis of the command value inputted from outside as described above. Since the predetermined threshold value is changed on the basis of the command value inputted from outside, the out-of-phase can be detected in the plural regions of the respective commands values (that is, the numbers of rotations) on the basis of the predetermined threshold values corresponding to the respective command values. In addition, because the out-of-phase is judged on the basis only of the number of rotations (whether or not the number of rotations is less than the predetermined threshold value), there is no need to provide, for example, an amplifier or the like for detecting an electric current value unlike a case where the electric current value is used for the judgement of the out-of-phase other than the number of rotations. Consequently, the out-of-phase can be detected in the plural regions of the numbers of rotations while the configuration is prevented from being complicated. In addition, since it is judged whether or not the out-of-phase is present by comparing the number of rotations detected by the number-of-rotations detection portion 13 and the predetermined threshold value with each other (whether or not the number of rotations is less than the predetermined threshold value), there is no need to perform calculation with the use of a relatively complicated calculation formula. Therefore, it can be restricted that load on the drive apparatus 100 increases.

In the embodiment, as described above, in a case where the command value inputted from outside is equal to or greater than the predetermined value (in the region in which the number of rotations is relatively high), it is easily judged whether or not the electric motor 110 is out of phase on the basis of the comparison of the number of rotations detected by the number-of-rotations detection portion 13 with the first threshold value. In a case where the command value inputted from outside is less than the predetermined value (in the region in which the number of rotations is relatively low), it is easily judged whether or not the electric motor 110 is out of phase on the basis of the comparison of the number of rotations detected by the number-of-rotations detection portion 13 with the second threshold value.

In the embodiment, as described above, the electric motor 110 is stopped in a case where it is judged that the electric motor 110 is out of phase. Consequently, it can be restricted that the driving of the electric motor 110 is continued in a state where the electric motor 110 is out of phase.

In the embodiment, as described above, by re-starting the electric motor 110 of which the rotor has been stopped at the predetermined position determined in advance, the electric motor 110 is started while the out-of-phase is being restricted from occurring.

(Variation examples) The aforementioned embodiment disclosed here is an example and is not restrictive in all respects. The scope of the present disclosure is defined by the scope of claims rather than by the explanations of the aforementioned embodiment, and includes all changes (variation examples) within the scope of claims and a range of equivalents thereof.

For example, in the aforementioned embodiment, the example is shown in which the two threshold values (the first threshold value and the second threshold value) are used to judge that the electric motor is out of phase, however, the disclosure is not limited thereto. For example, three or more threshold values may be used to judge that the electric motor is out of phase. The threshold value for judging that the electric motor is out of phase may be changed in a continuous manner in response to the command value.

In the aforementioned embodiment, the example is shown in which the predetermined value (duty ratio) for choosing the first threshold value or the second threshold value is 30%, however, the disclosure is not limited thereto. For example, the predetermined value may be other value than 30%.

In the aforementioned embodiment, the example is shown in which the first threshold value is 800 rpm and the second threshold value is 160 rpm, however, the disclosure is not limited thereto. For example, the first threshold value and the second threshold value may be other values than the above-stated values.

In the aforementioned embodiment, the example is shown in which the electric motor is stopped for one second in a case where the out-of-phase judgement portion judges that the electric motor is out of phase, however, the disclosure is not limited thereto. For example, a period of time for which the electric motor is stopped may be other value than one second.

In the aforementioned embodiment, the example is shown in which the electric pump apparatus corresponds to the electric water pump apparatus, however, the disclosure is not limited thereto. For example, the disclosure is applicable to the electric pump apparatus including an electric oil pump apparatus, for example.

According to the aforementioned embodiment, the drive apparatus 100 of the electric motor 110 which does not include the position detection sensor includes the drive portion 20 configured to drive the electric motor 110 on the basis of the command value inputted from outside, the number-of-rotations detection portion 13 configured to detect the number of rotations of the electric motor 110 driven by the drive portion 20, the out-of-phase judgement portion 15 judging that the electric motor 110 is out of phase in a case where the number of rotations detected by the number-of-rotations detection portion 13 is less than the predetermined threshold value, and the predetermined threshold value being configured to be changed on the basis of the command value inputted from outside.

According to the above-described configuration, the drive apparatus 100 of the electric motor 110 includes the out-of-phase judgement portion 15 which judges that the electric motor 110 is out of phase in a case where the number of rotations detected by the number-of-rotations detection portion 13 is less than the predetermined threshold value. The predetermined threshold value is changed on the basis of the command value inputted from outside. Thus, since the predetermined threshold value is changed on the basis of the command value inputted from outside, the out-of-phase can be detected in the plural regions of the commands values (that is, the numbers of rotations) on the basis of the predetermined threshold values corresponding to the respective command values. In addition, since the out-of-phase is judged on the basis only of the number of rotations (whether or not the number of rotations is less than the predetermined threshold value), there is no need to provide, for example, the amplifier for detecting the electric current value unlike a case where, for example, the electric current value is used in the judgement of the out-of-phase other than the number of rotations. Consequently, the out-of-phase or loss of synchronization can be detected in the plural regions of the numbers of rotations, while the configuration is prevented from being complicated. In addition, since it is judged whether the out-of-phase is present or not by comparing the number of rotations detected by the number-of-rotations detection portion 13 and the predetermined threshold value with each other (whether or not the number of rotations is less than the predetermined threshold value), there is no need to perform calculation with the use of a relatively complicated calculation formula. Therefore, it can be restricted that load on the drive apparatus 100 increases.

According to the aforementioned embodiment, the predetermined threshold value includes the first threshold value for a case in which the command value inputted from outside is equal to or greater than the predetermined value and the second threshold value for a case in which the command value inputted from outside is less than the predetermined value, and the second threshold value being smaller than the first threshold value. The predetermined threshold value is configured such that either of the first threshold value and the second threshold value is chosen on the basis of the command value inputted from outside.

According to the above-described configuration, in a case where the command value inputted from outside is equal to or greater than the predetermined value (the region in which the number of rotations is relatively high), it is easily judged whether or not the electric motor 110 is out of phase on the basis of the comparison of the number of rotations detected by the number-of-rotations detection portion 13 with the first threshold value). In a case where the command value inputted from outside is less than the predetermined value (the region in which the number of rotations is relatively low), it is easily judged whether or not the electric motor 110 is out of phase on the basis of the comparison of the number of rotations detected by the number-of-rotations detection portion 13 with the second threshold value.

According to the aforementioned embodiment, in a case where the out-of-phase judgement portion 15 judges that the electric motor 110 is out of phase, the voltage command to the electric motor 110 is stopped and the electric motor 110 is stopped.

According to the above-described configuration, the electric motor 110 is stopped in a case where the electric motor 110 is judged to be out of phase. Consequently, it can be restricted that the driving of the electric motor 110 continues in a state where the electric motor 110 is out of phase.

According to the aforementioned embodiment, in a case where the out-of-phase judgement portion 15 judges that the electric motor 110 is out of phase, the electric motor 110 that is in the stopped state is re-started.

Generally, in a case where an electric motor is stopped, the rotor is configured to be stopped at a predetermined position which is determined in advance, by a magnetic field of permanent magnet. According to the aforementioned embodiment, by re-starting the electric motor 110 of which the rotor has been stopped at the predetermined position determined in advance, the electric motor 110 is started while the occurrence of the out-of-phase or loss of synchronization is being restricted.

According to the aforementioned embodiment, the command value inputted from outside is the duty ratio corresponding to the target number of rotations of the electric motor 110.

According to the above-described configuration, the predetermined threshold value for judging the out-of-phase can be appropriately chosen on the basis of the command value inputted from outside because the occurrence of the out-of-phase is attributed to the number of rotations of the electric motor.

According to the aforementioned embodiment, the electric pump apparatus 200 includes the electric pump 210 configured to be driven by the electric motor 110 which does not include the position detection sensor, and the drive apparatus 100 of the electric motor 110. The drive apparatus 100 of the electric motor 110 includes the drive portion 20 configured to drive the electric motor 110 on the basis of the command value inputted from outside, the number-of-rotations detection portion 13 configured to detect the number of rotations of the electric motor 110 driven by the drive portion 20, the out-of-phase judgement portion 15 judging that the electric motor 110 is out of phase in a case where the number of rotations detected by the number-of-rotations detection portion 13 is less than the predetermined threshold value, and the predetermined threshold value being configured to be changed on the basis of the command value inputted from outside.

According to the electric pump apparatus 200 of the aforementioned embodiment, the drive apparatus 100 of the electric motor 110 which drives the electric pump 210 includes the out-of-phase judgement portion 15 judging that the electric motor 110 is out of phase in a case where the number of rotations detected by the number-of-rotations detection portion 13 is less than the predetermined threshold value. The predetermined threshold value is changed on the basis of the command value inputted from outside. Thus, since the predetermined threshold value is changed on the basis of the command value inputted from outside, the out-of-phase can be detected in the plural regions of the commands values (that is, the numbers of rotations) on the basis of the predetermined threshold values corresponding to the respective command values. In addition, since the out-of-phase is judged on the basis only of the number of rotations (whether or not the number of rotations is less than the predetermined threshold value), there is no need to provide, for example, the amplifier for detecting the electric current value unlike a case where, for example, the electric current value is used for the judgement of the out-of-phase in addition to the number of rotations. Consequently, the electric pump apparatus can be provided at which the out-of-phase or loss of synchronization can be detected in the plural regions of the numbers of rotations while the configuration is prevented from being complicated. In addition, since it is judged whether or not the out-of-phase is present by comparing the number of rotations detected by the number-of-rotations detection portion 13 and the predetermined threshold value with each other (whether or not the number of rotations is less than the predetermined threshold value), there is no need to perform calculation with the use of a relatively complicated calculation formula. Therefore, the electric pump apparatus can be provided at which increment of load on the drive apparatus 100 is restricted.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A drive apparatus of an electric motor which does not include a position detection sensor, the drive apparatus comprising:
   a drive portion configured to drive the electric motor on the basis of a command value inputted from outside;
   a number-of-rotations detection portion configured to detect a number of rotations of the electric motor driven by the drive portion; and
   an out-of-phase judgement portion judging that the electric motor is out of phase in a case where the number of rotations detected by the number-of-rotations detection portion is less than a predetermined threshold value,
   wherein drive apparatus is configured to control the drive portion to stop the electric motor in response to the out-of-phase judgment portion judging that motor is out of phase,
   wherein the predetermined threshold value is configured to be changed on the basis of the command value inputted from outside,
   wherein the predetermined threshold value includes a first threshold value for a case in which the command value inputted from outside is equal to or greater than a predetermined value and a second threshold value for a case in which the command value inputted from outside is less than the predetermined value, the second threshold value being smaller than the first threshold value, and
   the predetermined threshold value is configured such that either of the first threshold value and the second threshold value is chosen on the basis of the command value inputted from outside.

2. The drive apparatus of the electric motor according to claim 1, wherein in a case where the out-of-phase judgement portion judges that the electric motor is out of phase, a voltage command to the electric motor is stopped and the electric motor is stopped.

3. The drive apparatus of the electric motor according to claim 2, wherein in a case where the out-of-phase judgement portion judges that the electric motor is out of phase, the electric motor that is in a stopped state is re-started.

4. The drive apparatus of the electric motor according to claim 1, wherein the command value inputted from outside is a duty ratio corresponding to a target number of rotations of the electric motor.

5. An electric pump apparatus comprising:
   an electric pump configured to be driven by an electric motor which does not include a position detection sensor;
   a drive apparatus of the electric motor; and
   the drive apparatus of the electric motor including:
     a drive portion configured to drive the electric motor on the basis of a command value inputted from outside;
     a number-of-rotations detection portion configured to detect a number of rotations of the electric motor driven by the drive portion; and
     an out-of-phase judgement portion judging that the electric motor is out of phase in a case where the number of rotations detected by the number-of-rotations detection portion is less than a predetermined threshold value, wherein drive apparatus is configured to control the drive portion to stop the electric motor in response to the out-of-phase judgment portion judging that motor is out of phase, wherein the predetermined threshold value being configured to be changed on the basis of the command value inputted from outside, wherein the predetermined threshold value includes a first threshold value for a case in which the command value inputted from outside is equal to or greater than a predetermined value and a second threshold value for a case in which the command value inputted from outside is less than the predetermined value, the second threshold value being smaller than the first threshold value, and the predetermined threshold value is configured such that either of the first threshold value and the second threshold value is chosen on the basis of the command value inputted from outside.

\* \* \* \* \*